(12) United States Patent
Nomura

(10) Patent No.: US 10,017,058 B2
(45) Date of Patent: Jul. 10, 2018

(54) AUTOMOBILE

(71) Applicant: Toyota Jidosha Kabushiki Kaisha, Toyoto-shi, Aichi-ken (JP)

(72) Inventor: Yoshihiro Nomura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/462,073

(22) Filed: Mar. 17, 2017

(65) Prior Publication Data

US 2017/0274782 A1    Sep. 28, 2017

(30) Foreign Application Priority Data

Mar. 22, 2016 (JP) ................. 2016-057233

(51) Int. Cl.
*B60L 1/00* (2006.01)
*B60L 3/00* (2006.01)
*H02G 3/00* (2006.01)
*B60L 11/18* (2006.01)
*H02M 3/04* (2006.01)
*H02M 7/44* (2006.01)
*H02P 27/06* (2006.01)

(52) U.S. Cl.
CPC ....... *B60L 11/1811* (2013.01); *B60L 11/1803* (2013.01); *B60L 11/1816* (2013.01); *H02M 3/04* (2013.01); *H02M 7/44* (2013.01); *B60L 2210/10* (2013.01); *B60L 2210/40* (2013.01); *H02P 27/06* (2013.01)

(58) Field of Classification Search
CPC ........ H02J 7/00; H02J 7/02; H02J 7/04; H02J 7/14; B60L 11/16; B60L 11/00; B60L 1/00

USPC .......... 307/10.1, 10.2, 9.1, 64, 66; 320/134, 320/136, 104, 140
See application file for complete search history.

(56) References Cited

U.S. PATENT DOCUMENTS

| 5,444,352 A * | 8/1995 | Hutchings ......... H01M 10/0413 320/104 |
| 8,742,718 B2 * | 6/2014 | Sugiyama ............... B60L 3/003 307/10.1 |
| 2012/0306263 A1 * | 12/2012 | Tashiro ............... B60L 11/1868 307/9.1 |

FOREIGN PATENT DOCUMENTS

| JP | 2011234536 A | 11/2011 |
| JP | 2015180138 A | 10/2015 |

(Continued)

*Primary Examiner* — Rexford Barnie
*Assistant Examiner* — Jagdeep Dhillon
(74) *Attorney, Agent, or Firm* — Dinsmore & Shohl LLP

(57) ABSTRACT

When ignition-on operation is made in first electric power supply processing during external charging, and a post-operation electric energy is not larger than a predetermined electric energy that is an electric energy consumption of a low-voltage device after the ignition-on operation, an automobile continues the first electric power supply processing. In the first electric power supply processing, from between a first DC/DC converter and a second DC/DC converter, only the second DC/DC converter is selected to run to supply electric power to a low-voltage-system electric power line. When the post-operation electric energy exceeds the predetermined electric energy, the automobile makes a switch to second electric power supply processing in which only the first DC/DC converter is selected to run from between the first DC/DC converter and the second DC/DC converter to supply electric power to the low-voltage-system electric power line.

8 Claims, 4 Drawing Sheets

(56) References Cited

FOREIGN PATENT DOCUMENTS

| | | | |
|---|---|---|---|
| JP | 2015201995 | A | 11/2015 |
| WO | 2013/098904 | A1 | 7/2013 |
| WO | 2015140618 | A1 | 9/2015 |

* cited by examiner

AUTOMOBILE

CROSS-REFERENCE TO RELATED TO APPLICATIONS

This application claims priority to Japanese Patent Application No. 2016-057233 filed on Mar. 22, 2016, the entire contents of which are hereby incorporated by reference.

BACKGROUND

1. Technical Field

The disclosure relates to an automobile, in particular, to an automobile that includes a motor, a high-voltage battery, a charger, low-voltage devices, and two DC/DC converters.

2. Description of Related Art

As an automobile of this kind, there is proposed an automobile including a motor for traveling the automobile, an assembled battery that is connected to the motor via a first electric power line, a charger that is connected to the first electric power line and is capable of charging the assembled battery with electric power from an external electric-power source, auxiliaries that are connected to a second electric power line, a first DC/DC converter that is capable of supplying electric power of the first electric power line to the second electric power line with step down of voltage, and a second DC/DC converter that is built in the charger and is capable of supplying the electric power of the first electric power line to the second electric power line with step down of voltage (e.g., see WO 2013/098904 A).

SUMMARY

In such an automobile, a DC/DC converter having a low rated output in comparison with the first DC/DC converter is often used as the second DC/DC converter. In addition, the auxiliaries include an auxiliary that comes into an activated state in an ignition-on state and comes into a deactivated state in an ignition-off state. Therefore, in the ignition-on state, the total electric power consumption of the low-voltage devices connected to the second electric power line (the auxiliaries and an electronic control unit) is large in comparison with the ignition-off state. Therefore, in charging the assembled battery with electric power from the external electric-power source, it is conceivable that first electric power supply processing is executed in the ignition-off state, a switch is made to second electric power supply processing when ignition-on operation is made, and a switch is made to the first electric power supply processing when ignition-off operation is thereafter made. Here, the first electric power supply processing is processing in which only the second DC/DC converter is selected to run from between the first and second DC/DC converters to supply electric power to the second electric power line, and the second electric power supply processing is processing in which only the first DC/DC converter is selected to run from between the first and second DC/DC converters to supply electric power to the second electric power line. When switches are made between the first electric power supply processing and the second electric power supply processing in such a manner, the number of times of switching becomes relatively large, and there is the risk of decreasing durabilities of the first DC/DC converter and the second DC/DC converter.

The automobile according to the disclosure restrains decreases in durabilities of the first DC/DC converter and the second DC/DC converter.

An automobile in a first aspect of the disclosure includes: a motor configured to drive the automobile; a high-voltage battery connected to the motor via a high-voltage-system electric power line; a charger connected to the high-voltage-system electric power line, the charger being capable of charging in which the high-voltage battery is charged with electric power from an external electric-power source; a low-voltage device connected to a low-voltage-system electric power line; a first DC/DC converter connected to the high-voltage-system electric power line and the low-voltage-system electric power line, the first DC/DC converter being capable of supplying electric power of the high-voltage-system electric power line to the low-voltage-system electric power line with step down of voltage; a second DC/DC converter connected to the high-voltage-system electric power line on the side closer to the charger than the first DC/DC converter and to the low-voltage-system electric power line, the second DC/DC converter having a rated output that is lower than the rated output of the first DC/DC converter and being capable of supplying electric power of the high-voltage-system electric power line to the low-voltage-system electric power line with step down of voltage; and an electronic control unit. The electronic controller is configured to, in a case where ignition-on operation is made in first electric power supply processing during the external charging, the first electric power supply processing being processing in which only the second DC/DC converter is selected to run from between the first and second DC/DC converters to supply electric power to the low-voltage-system electric power line, a post-operation electric energy being an electric energy consumption of the low-voltage device after the ignition-on operation, i) continue the first electric power supply processing when the post-operation electric energy is not larger than a predetermined electric energy, and ii) make a switch to second electric power supply processing in which only the first DC/DC converter is selected to run from between the first and second DC/DC converters to supply electric power to the low-voltage-system electric power line when the post-operation electric energy exceeds the predetermined electric energy.

According to the aspect, it is possible to restrain an increase in the number of times of switching between the first electric power supply processing and the second electric power supply processing in comparison with an electric automobile that immediately makes a switch to the second electric power supply processing when the ignition-on operation is made. In particular, in the case where the ignition-off operation is made in a relatively short time period from the ignition-on operation, it is possible to restrain, more reliably, a switch between the first electric power supply processing and the second electric power supply processing. As a result, it is possible to restrain decreases in durabilities of the first DC/DC converter and the second DC/DC converter. Here, examples of the low-voltage devices can include a plurality of auxiliaries (e.g., a headlight, a room lamp, an audio system, a power window, a sheet heater, etc.), the electronic control unit, and the like.

In the aspect, the electronic control unit may be configured to perform ignition-off automatically when a predetermined time period elapses from the ignition-on operation. According to the configuration, it is possible to restrain, more reliably, a switch between the first electric power supply processing and the second electric power supply processing even when the ignition-off operation is not made in the relatively short time period from the ignition-on operation.

The automobile in the aspect may further include an instruction switch that issues instructions to secure electric power, using electric power from the external electric-power source, for the operation of the low-voltage device and a high-voltage device that is connected to the high-voltage-system electric power line. The electronic control unit may be configured to make a switch to the second electric power supply processing even when the post-operation electric energy is not larger than the predetermined electric energy, in the case where the instruction switch is turned on after the ignition-on operation while the first electric power supply processing is executed. When the instruction switch is turned on, it is assumed that the total electric power consumption of the low-voltage devices and the high-voltage device becomes relatively large. Therefore, by making a switch to the second electric power supply processing (in advance), it is possible to deal with, more sufficiently, the total electric power consumption of the low-voltage devices and the high-voltage device becoming relatively large. Here, examples of the high-voltage device can include an air conditioner.

In the aspect, in the case where the instruction switch is off after the ignition-on operation, the electronic control unit may be configured to perform automatic ignition-off when a predetermined time period elapses from the ignition-on operation, and in the case where the instruction switch is on after the ignition-on operation, the electronic control unit may be configured not to perform the automatic ignition-off even when the predetermined time period elapses from the ignition-on operation. According to the aspect, it is possible to restrain, more reliably, a switch between the first electric power supply processing and the second electric power supply processing when the instruction switch is off, and to avoid the unavailability of a specific low-voltage device or high-voltage device (e.g., an audio system or an air conditioner) due to the automatic ignition-off when the instruction switch is on.

The automobile in the aspect may further include an instruction switch that issues instructions to secure electric power, using electric power from the external electric-power source, for the operation of the low-voltage device and a high-voltage device that is connected to the high-voltage-system electric power line. The electronic control unit may be configured to make a switch from the first electric power supply processing to the second electric power supply processing when the instruction switch is turned on after the ignition-on operation.

The automobile in the aspect may further include: a capacitor that is attached to the high-voltage-system electric power line; and a system main relay that is provided, on the high-voltage-system electric power line, between the motor, the capacitor, and the first DC/DC converter, and the high-voltage battery and the charger. Furthermore, the electronic control unit may be configured to make a switch to the second electric power supply processing by turning on the system main relay.

In the configuration, to execute the second electric power supply processing during the external charging, the system main relay needs to be turned on. Therefore, in the case where the ignition-on operation is made in the first electric power supply processing during the external charging, by turning on the system main relay and making a switch to the second electric power supply processing when the post-operation electric energy exceeds the predetermined electric energy (by not making a switch to the second electric power supply processing until the post-operation electric energy exceeds the predetermined electric energy), it is possible to restrain an increase in the number of times of switching between the first electric power supply processing and the second electric power supply processing, as well as to restrain an increase in the number of turn-ons or turn-offs of the system main relay, an increase in time period for which voltage is applied to the capacitor, and the like. As a result, it is possible to restrain decreases in the durabilities of the first DC/DC converter and the second DC/DC converter, as well as to restrain decreases in durabilities of the system main relay and the capacitor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, an embodiment will be used to describe a mode for carrying out the disclosure.

Figure 1:
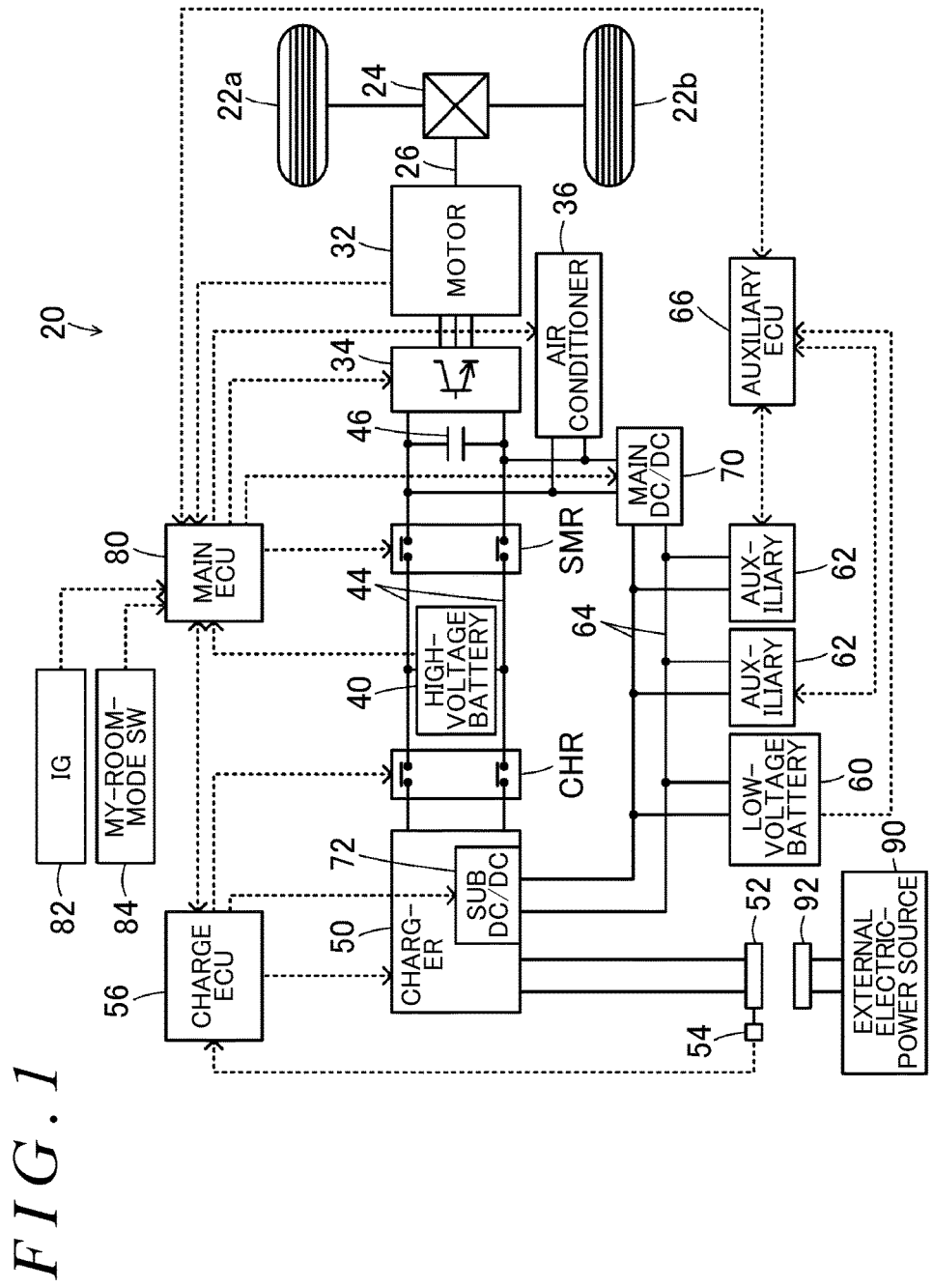
FIG. 1 is a configuration diagram illustrating a schematic configuration of an electric automobile as an embodiment of the disclosure.

FIG. 1 is a configuration diagram illustrating a schematic configuration of an electric automobile 20 as an embodiment of the disclosure. As illustrated, the electric automobile 20 in the example includes a motor 32, an inverter 34, an air conditioner 36, a high-voltage battery 40, a charger 50, a low-voltage battery 60, a main DC/DC converter 70, a sub DC/DC converter 72, a system main relay SMR, a charging relay CHR, and a main electronic control unit (hereinafter, referred to as a main ECU) 80.

The motor 32 is configured in the form of, for example, a synchronous generator-motor, and is connected to a driving shaft 26 that is coupled to drive wheels 22a, 22b via a differential gear 24. The inverter 34 is used for driving the motor 32, and is connected to a high-voltage-system electric power line 44. To the high-voltage-system electric power line 44, a smoothing capacitor 46 is attached. The motor 32 is rotationally driven by a plurality of switching elements (not illustrated) of the inverter 34 that are under switching control by the main ECU 80. The air conditioner 36 is connected to the high-voltage-system electric power line 44, and is controlled by the main ECU 80 to perform air conditioning of the inside of an occupant compartment. The air conditioner 36 functions as a high-voltage device according to the disclosure.

The high-voltage battery 40 is configured as, for example, a lithium-ion secondary battery or a nickel-metal hydride secondary battery having a rated voltage of 200 V, 250 V, or 300 V, and as described above, is connected to the inverter 34 via the high-voltage-system electric power line 44.

The charger 50 is connected to the high-voltage-system electric power line 44, and is configured to charge the high-voltage battery 40 with electric power from an external electric-power source 90 when an electric-automobile-side connector 52 is connected to an electric-power-source-side connector 92 of the external electric-power source 90. The charger 50 supplies electric power from the external electric-power source 90 to the high-voltage battery 40 under control of a charging electronic control unit (hereinafter, referred to as a charge ECU) 56 when the electric-automobile-side connector 52 is connected to the electric-power-source-side connector 92.

The low-voltage battery 60 is configured in the form of, for example, a lead acid battery having a rated voltage of 12 V, and is connected to a low-voltage-system electric power line 64. To the low-voltage-system electric power line 64, a plurality of auxiliaries 62 (e.g., a headlight, a room lamp, an audio system, a power window, a sheet heater, etc.), the charge ECU 56, an auxiliary electronic control unit (hereinafter, referred to as an auxiliary ECU) 66, and the main ECU 80 are also connected. The plurality of auxiliaries 62, the charge ECU 56, the auxiliary ECU 66, and the main ECU 80 functions as low-voltage devices according to the disclosure.

Although not illustrated, the auxiliary ECU 66 is configured in the form of a microprocessor including a CPU that forms a main part of the microprocessor, and in addition to the CPU, includes a read only memory (ROM) for storing a processing program, a random access memory (RAM) for storing data temporarily, input and output ports, and a communications port. The auxiliary ECU 66 receives, via the input port, signals from various sensors, for example, a voltage from a voltage sensor for detecting the voltage of the low-voltage battery 60, electric power consumptions Ph[i] (i: a number indicating each device) from the plurality of auxiliaries 62, the charge ECU 56, the auxiliary ECU 66, and the main ECU 80, and the like. From the auxiliary ECU 66, control signals to the plurality of auxiliaries 62, and the like are output via the output port. The auxiliary ECU 66 is connected to the main ECU 80 via the communications port. The auxiliary ECU 66 calculates a total electric power consumption Ph of the low-voltage devices based on the electric power consumptions Ph[i] from the plurality of auxiliaries 62, the charge ECU 56, the auxiliary ECU 66, and the main ECU 80.

The main DC/DC converter 70 is connected to the high-voltage-system electric power line 44 and the low-voltage-system electric power line 64. The main DC/DC converter 70 supplies electric power of the high-voltage-system electric power line 44 to the low-voltage-system electric power line 64 with step down of voltage, under the control of the main ECU 80.

The sub DC/DC converter 72 is configured in the form of a DC/DC converter having a rated output that is lower than that of the main DC/DC converter 70. The sub DC/DC converter 72 is connected to the high-voltage-system electric power line 44 on the side closer to the charger 50 than the main DC/DC converter 70, and to the low-voltage-system electric power line 64. In the embodiment, the sub DC/DC converter 72 is built in the charger 50. The sub DC/DC converter 72 supplies electric power of the high-voltage-system electric power line 44 to the low-voltage-system electric power line 64 with step down of voltage, under the control of the charge ECU 56.

The system main relay SMR is provided, on the high-voltage-system electric power line 44, between the high-voltage battery 40, and the inverter 34, the capacitor 46, and the main DC/DC converter 70, and is turned on or off to connect or disconnect the connection between the high-voltage battery 40 side of the high-voltage-system electric power line 44, and the inverter 34 side, capacitor 46 side, and main DC/DC converter 70 side of the high-voltage-system electric power line 44, under the control of the main ECU 80.

The charging relay CHR is provided between the high-voltage battery 40 on the high-voltage-system electric power line 44, and the charger 50 and the sub DC/DC converter 72, and is turned on or off to connect or disconnect the connection between the high-voltage battery 40 side of the high-voltage-system electric power line 44, and the charger 50 side and sub DC/DC converter 72 side of the high-voltage-system electric power line 44, under the control of the charge ECU 56.

Although not illustrated, the charge ECU 56 is configured in the form of a microprocessor including a CPU that forms a main part of the microprocessor, and in addition to the CPU, includes a ROM for storing a processing program, a RAM for storing data temporarily, input and output ports, a communications port, and the like. The charge ECU 56 receives, via the input port, signals from various sensors attached to the charger 50, a connection detection signal from a connection detection sensor 54 that is attached to the electric-automobile-side connector 52 and detects the connection of the electric-automobile-side connector 52 to the electric-power-source-side connector 92 of the external electric-power source 90 when the connection is established, and the like. The charge ECU 56 outputs, via the output port, a control signal to the charger 50, a control signal to the sub DC/DC converter 72, a control signal to the charging relay CHR, and the like. The charge ECU 56 is connected to the main ECU 80 via the communications port.

Although not illustrated, the main ECU 80 is configured in the form of a microprocessor including a CPU that forms a main part of the microprocessor, and in addition to the CPU, includes a ROM for storing a processing program, a RAM for storing data temporarily, input and output ports, a communications port, and the like. The main ECU 80 receives signals from various sensors via the input port. Examples of the signals input into the main ECU 80 include a rotational position of a rotor of the motor 32 from a rotational position sensor for detecting the rotational position of the rotor of the motor 32, a voltage from a voltage sensor for sensing the voltage of the high-voltage battery 40, and a current from a current sensor for detecting the current of the high-voltage battery 40. The examples of the signals also include an ignition signal from an ignition switch 82, a switch signal from a my-room-mode switch 84 that issues instructions to secure electric power, using electric power from the external electric-power source 90, for the operation of the low-voltage devices and the high-voltage device (hereinafter, referred to as a my-room mode). The examples of the signals further include a shift position SP from a shift position sensor, an accelerator operation amount from an accelerator pedal position sensor, a brake pedal position from a brake pedal position sensor, and a speed of the electric automobile from a speed sensor. The main ECU 80 outputs various control signals via the output port. Examples of the signals output from the main ECU 80 include switching control signals for the plurality of switching elements of the inverter 34, a control signal for the air conditioner 36, a control signal for the main DC/DC converter 70, a control signal for the system main relay SMR. The main ECU 80 is connected to the charge ECU 56 and the auxiliary ECU 66 via the communications port. The main ECU 80 calculates a state of charge SOC of the high-voltage battery 40 based on an integrated value of current of the high-voltage battery 40 from the current sensor.

In the electric automobile 20 in the example with this configuration, when the electric-automobile-side connector 52 is connected to the electric-power-source-side connector 92 of the external electric-power source 90 while the electric automobile 20 is parked in a charging point such as a house of an owner of the electric automobile 20 or a charging station, the charge ECU 56 controls the charger 50 so that the high-voltage battery 40 is put on charge with electric power from the external electric-power source 90, with the charging relay CHR turned on. Putting the high-voltage battery 40 on charge by the charger 50 with electric power from the external electric-power source 90, that is, external charging is performed in such a manner. It is assumed here that, during the external charging, the system main relay SMR is basically turned off in an ignition-off state. Therefore, the configuration is made so that, between first electric power supply processing and second electric power supply processing, the first electric power supply processing is executed when electric power needs to be supplied from the high-voltage-system electric power line 44 to the low-voltage-system electric power line 64. In the first electric power supply processing, only the sub DC/DC converter 72 is selected to run from between the main DC/DC converter 70 and the sub DC/DC converter 72. In the second electric power supply processing, only the main DC/DC converter 70 is selected to run from between the main DC/DC converter 70 and the sub DC/DC converter 72. As described above, since the rated output of the sub DC/DC converter 72 is lower than the rated output of the main DC/DC converter 70, electric power that can be supplied to the low-voltage-system electric power line 64 in the first electric power supply processing is small in comparison with electric power that can be supplied to the low-voltage-system electric power line 64 in the second electric power supply processing.

Figure 2:
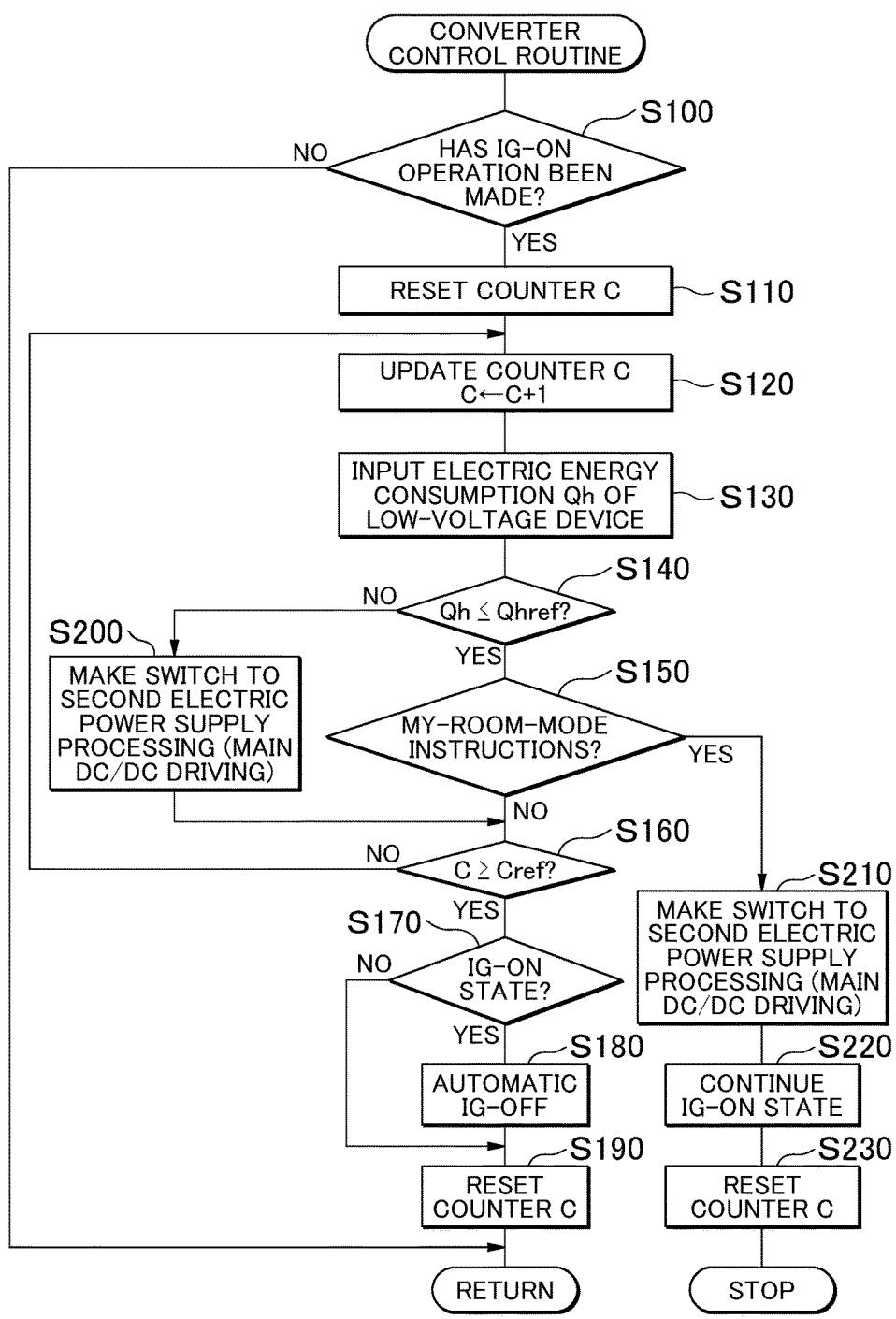
FIG. 2 is a flowchart illustrating a converter control routine executed by a main ECU in the embodiment.

Next, how the electric automobile 20 in the example with such configuration operates, in particular, how the main DC/DC converter 70 and the sub DC/DC converter 72 operate during the external charging will be described. FIG. 2 is a flowchart illustrating a converter control routine executed by the main ECU 80 in the embodiment. The routine is repeatedly executed during the external charging unless the instructions of the my-room mode are issued by the my-room-mode switch 84.

When the converter control routine is started, the main ECU 80 first determines whether an ignition-on operation has been made (step S100), and when it is determined that the ignition-on operation has not been made, the main ECU 80 terminates the routine. In this case, the first electric power supply processing is executed (continued).

When it is determined in step S100 that the ignition-on operation has been made, the main ECU 80 resets a counter C to a value of zero and then updates the counter C by incrementing it by a value of one (steps S110, S120). In addition, a post-operation electric energy Qh is input (step S130). The post-operation electric energy Qh is an electric energy consumption of the low-voltage devices after the ignition-on operation. Here, the post-operation electric energy Qh is configured to be input, through communication from the auxiliary ECU 66, as a value obtained in the form of an integrated value of the total electric power consumption Ph of the low-voltage devices (the plurality of auxiliaries 62, the charge ECU 56, the auxiliary ECU 66, and the main ECU 80) after the ignition-on operation. The total electric power consumption Ph of the low-voltage devices becomes large in the ignition-on state in comparison with the ignition-off state because the plurality of auxiliaries 62 include an auxiliary (e.g., an audio system) that comes into an activated state in an ignition-on state and comes into a deactivated state in the ignition-off state.

When the post-operation electric energy Qh is input in such a manner, the main ECU 80 compares the input post-operation electric energy Qh with a threshold value Qhref (step S140). Here, the threshold value Qhref is determined as an electric energy at which the execution of the first electric power supply processing may be continued. For example, 900 Asec, 950 Asec, 1000 Asec, and the like can be used as the threshold value Qhref.

When the post-operation electric energy Qh is not larger than the threshold value Qhref, the main ECU 80 determines whether the instructions of the my-room mode have been issued with a switch signal from the my-room-mode switch 84 (step S150). When it is determined that the instructions of the my-room mode has not been issued, the main ECU 80 compares the counter C with a threshold value Cref (step S160). Here, the threshold value Cref is determined as a value that is slightly smaller than a value C1 of the counter C. The value C1 is equivalent to a time period taken for the post-operation electric energy Qh to reach the threshold value Qhref or larger when the total electric power consumption Ph of the low-voltage devices after the ignition-on operation is not very large. For example, values of the counter C equivalent to 90 sec, 100 sec, and 110 sec can be used.

When the counter C is smaller than the threshold value Cref, the main ECU 80 returns the routine to step S120. The main ECU 80 then repeats the execution of the processes of steps S120 to S160. When the counter C reaches the threshold value Cref or larger in step S160, the main ECU 80 performs automatic ignition-off in the ignition-on state (steps S170, S180), resets the counter C to a value of zero (step S190), and terminates the routine.

When the post-operation electric energy Qh becomes larger than the threshold value Qhref in step S140 while the execution of the processes of steps S120 to S160 is repeated, the main ECU 80 turns on the system main relay SMR, makes a switch to the second electric power supply processing (step S200), and executes the process of step S160 and the subsequent steps. Therefore, when the counter C thereafter reaches the threshold value Cref or larger in step S160, the main ECU 80 performs the automatic ignition-off in the ignition-on state (steps S170, S180), resets the counter C to a value of zero (step S190), and terminates the routine. In this case, the main ECU 80 is configured to keep the system main relay SMR on and continue the second electric power supply processing when performing the automatic ignition-off. This configuration enables the restraint on a switch from the second electric power supply processing to the first electric power supply processing.

In the embodiment, as mentioned above, since the first electric power supply processing is continued when the post-operation electric energy Qh is not larger than the threshold value Qhref after the ignition-on operation, it is possible to restrain an increase in the number of time of switching between the first electric power supply processing and the second electric power supply processing, an increase in the number of turn-ons or turn-offs of the system main relay SMR, an increase in time period for which voltage is applied to the capacitor 46, and the like, in comparison with an electric automobile that immediately makes a switch to the second electric power supply processing when the ignition-on operation is made. In addition, as mentioned above, since the total electric power consumption Ph of the low-voltage devices is small in the ignition-off state in comparison with the ignition-on state, it is possible to restrain, more reliably, a switch between the first electric power supply processing and the second electric power supply processing, turning on the system main relay SMR, applying voltage to the capacitor 46, and the like, particularly in the case where ignition-off operation is made in a relatively short time period (before the post-operation electric energy Qh exceeds the threshold value Qhref) from the ignition-on operation. As the result of the restraints, it is possible to restrain decreases in durabilities of the main DC/DC converter, the sub DC/DC converter, the system main relay SMR, the capacitor 46, and the like. In addition, in an electric automobile in which the second electric power supply processing is kept as a fail-safe processing irrespective of the total electric power consumption Ph of the low-voltage devices and the like when the number of times of switching between the first electric power supply processing and the second electric power supply processing is relatively large, it is possible to restrain a decrease in energy efficiency due to the operation of the fail-safe processing.

Moreover, since the automatic ignition-off is performed to bring about the ignition-off state when the counter C reaches the threshold value Cref or larger after the ignition-on operation, it is possible to restrain, more reliably, a switch from the first electric power supply processing to the second electric power supply processing even when the ignition-off operation is not made in the relatively short time period from the ignition-on operation.

When it is determined in step S150 that the instructions of the my-room mode have been issued, the main ECU 80 makes a switch to the second electric power supply processing irrespective of whether or not the post-operation electric energy Qh is smaller than the threshold value Qhref (step S210), determines that the ignition-on state is continued, that is, the automatic ignition-off is not performed (step S220), resets the counter C to a value of zero (step S230), and terminates the routine.

When the instructions of the my-room mode are issued, the total electric power consumption Ph of the low-voltage devices is assumed to be relatively large. Thus, by making a switch to the second electric power supply processing (in advance), it is possible to deal with, more sufficiently, the total electric power consumption Ph of the low-voltage devices becoming relatively large. At this point, use of the air conditioner 36 is also assumed. In addition, by not performing the automatic ignition-off when the instructions of the my-room mode are issued, it is possible to avoid the unavailability of a specific low-voltage device or high-voltage device, for example, the audio system or the air conditioner 36, due to the automatic ignition-off. The determination in step S150 may be performed prior to step S140. In this case, when the determination in step S150 turns out Yes, the main ECU 80 makes a switch to the second electric power supply processing and thereafter performs the determination in step S140, when the determination in step S140 turns out Yes, the routine proceeds to step S160, when the determination in step S140 turns out No, the routine proceeds to step S220, and the subsequent processes are executed.

Figure 3:
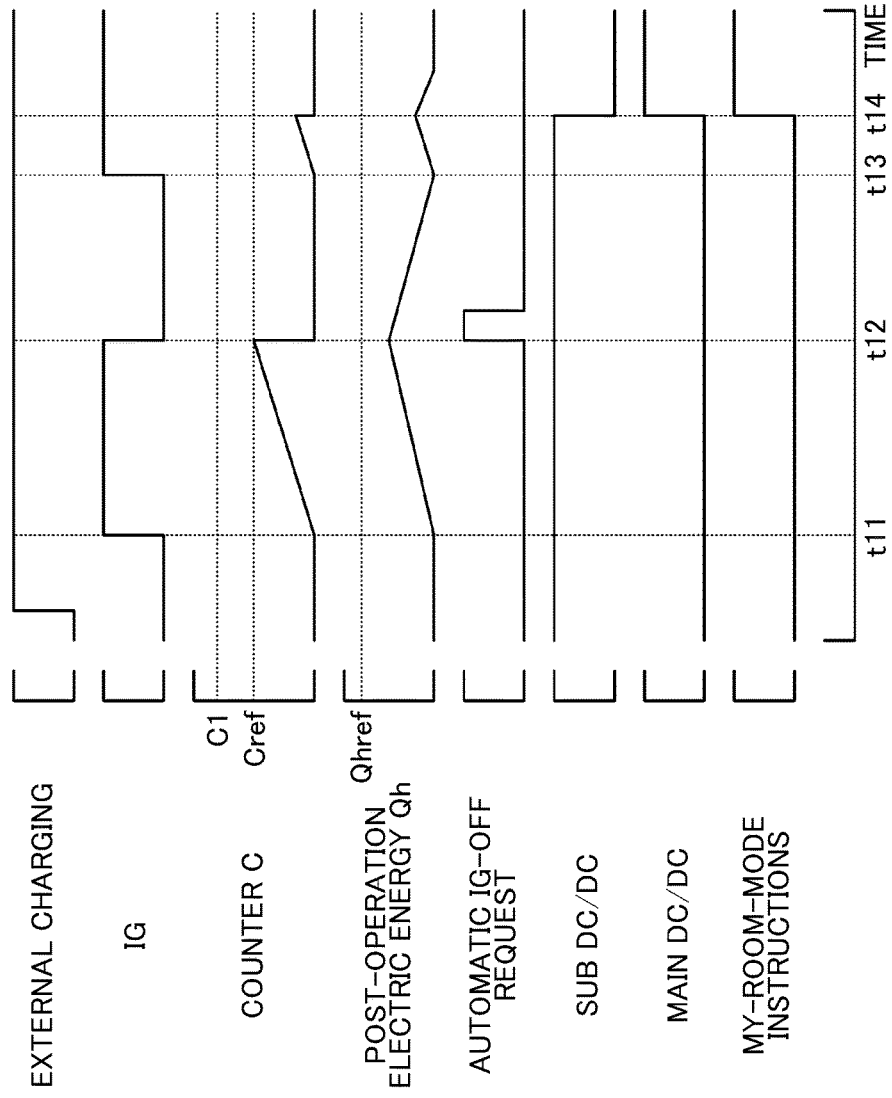
FIG. 3 is an explanative chart illustrating an example of change of the state during external charging.

FIG. 3 is an explanative chart illustrating an example of change of the state during the external charging. As illustrated, in the ignition-off state during the external charging, the sub DC/DC converter 72 is driven, and the main DC/DC converter 70 is stopped (the first electric power supply processing is executed). Then, when the ignition-on operation is made (time point t11), the counter C and the post-operation electric energy Qh increase with time. During the increase, the first electric power supply processing is continued. This enables restraint on an increase in the number of times of switching between the first electric power supply processing and the second electric power supply processing in comparison with an electric automobile that immediately makes a switch to the second electric power supply processing when the ignition-on operation is made. When the counter C thereafter reaches the threshold value Cref or larger before the post-operation electric energy Qh reaches the threshold value Qhref (the counter C reaches a threshold value C1 or larger) (time point t12), the main ECU 80 performs the automatic ignition-off. This enables more reliable restraint on a switch between the first electric power supply processing and the second electric power supply processing. When the ignition-on operation is made again (time point t13), and the instructions of the my-room mode are thereafter issued (time point t14), the main ECU 80 makes a switch to the second electric power supply processing. This allows for dealing with the total electric power consumption Ph of the low-voltage devices when the total electric power consumption Ph becomes relatively large. By not performing the automatic ignition-off when the instructions of the my-room mode are issued, it is possible to avoid the unavailability of a specific low-voltage device or high-voltage device.

In the electric automobile 20 in the example described above, when the ignition-on operation is made in the first electric power supply processing during the external charging, and the post-operation electric energy Qh is then not larger than the threshold value Qhref, the main ECU 80 continues the first electric power supply processing, and when the post-operation electric energy Qh exceeds the threshold value Qhref, the main ECU 80 makes a switch to the second electric power supply processing. This enables restraint on an increase in the number of times of switching between the first electric power supply processing and the second electric power supply processing in comparison with an electric automobile that immediately makes a switch to the second electric power supply processing when the ignition-on operation is made. In particular, in the case where the ignition-off operation is made in a relatively short time period (before the post-operation electric energy Qh exceeds the threshold value Qhref) from the ignition-on operation, it is possible to restrain a switch between the first electric power supply processing and the second electric power supply processing. As a result, it is possible to restrain decreases in durabilities of the main DC/DC converter and the sub DC/DC converter.

In the electric automobile 20 in the example, when the ignition-on operation is made in the first electric power supply processing during the external charging, and the counter C thereafter reaches the threshold value Cref or larger, the main ECU 80 performs the automatic ignition-off. This enables more reliable restraint on a switch between from the first electric power supply processing to the second electric power supply processing even when the ignition-off operation is not made in a relatively short time period from the ignition-on operation.

In the electric automobile 20 in the example, the main ECU 80 is configured so that, when the ignition-on operation is made during the external charging, and the counter C thereafter reaches the threshold value Cref or larger, the main ECU 80 performs the automatic ignition-off. However, the main ECU 80 may be configured not to perform the automatic ignition-off at this point.

In the electric automobile 20 in the example, the main ECU 80 is configured so that, when the ignition-on operation is made in the first electric power supply processing during the external charging, and the main ECU 80 thereafter makes a switch to the second electric power supply processing and then performs the automatic ignition-off, the main ECU 80 keeps the system main relay SMR on and continues the second electric power supply processing. However, the main ECU 80 may be configured to turn off the system main relay SMR and make a switch to the first electric power supply processing at this point.

In the electric automobile 20 in the example, the main ECU 80 is configured so that, when the instructions of the my-room mode are issued after the ignition-on operation is made in the first electric power supply processing during the external charging, the main ECU 80 makes a switch to the second electric power supply processing irrespective of whether or not the post-operation electric energy Qh is smaller than the threshold value Qhref. However, the main ECU 80 may be configured to make a switch to the second electric power supply processing when the post-operation electric energy Qh reaches the threshold value Qhref or larger.

In the electric automobile 20 in the example, the main ECU 80 is configured so that, when the main ECU 80 makes a switch to the second electric power supply processing after the ignition-on operation is made in the first electric power supply processing during the external charging, the main ECU 80 performs the automatic ignition-off when the counter C reaches the threshold value Cref or larger, irrespective of whether or not the instructions of the my-room mode have been issued. However, the main ECU 80 may be configured not to perform the automatic ignition-off when the instructions of the my-room mode have been issued, even when the main ECU 80 makes a switch to the second electric power supply processing after the ignition-on operation is made in the first electric power supply processing during the external charging. In this case, in the control routine of FIG. 2, the main ECU 80 may be configured to execute the process of step S150 immediately prior to the process of step S140 (determine whether the instructions of the my-room mode have been issued, immediately before comparing the post-operation electric energy Qh with the threshold value Qhref).

The electric automobile 20 in the example is configured to include the my-room-mode switch 84 but may be configured not to include the my-room-mode switch 84.

Figure 4:
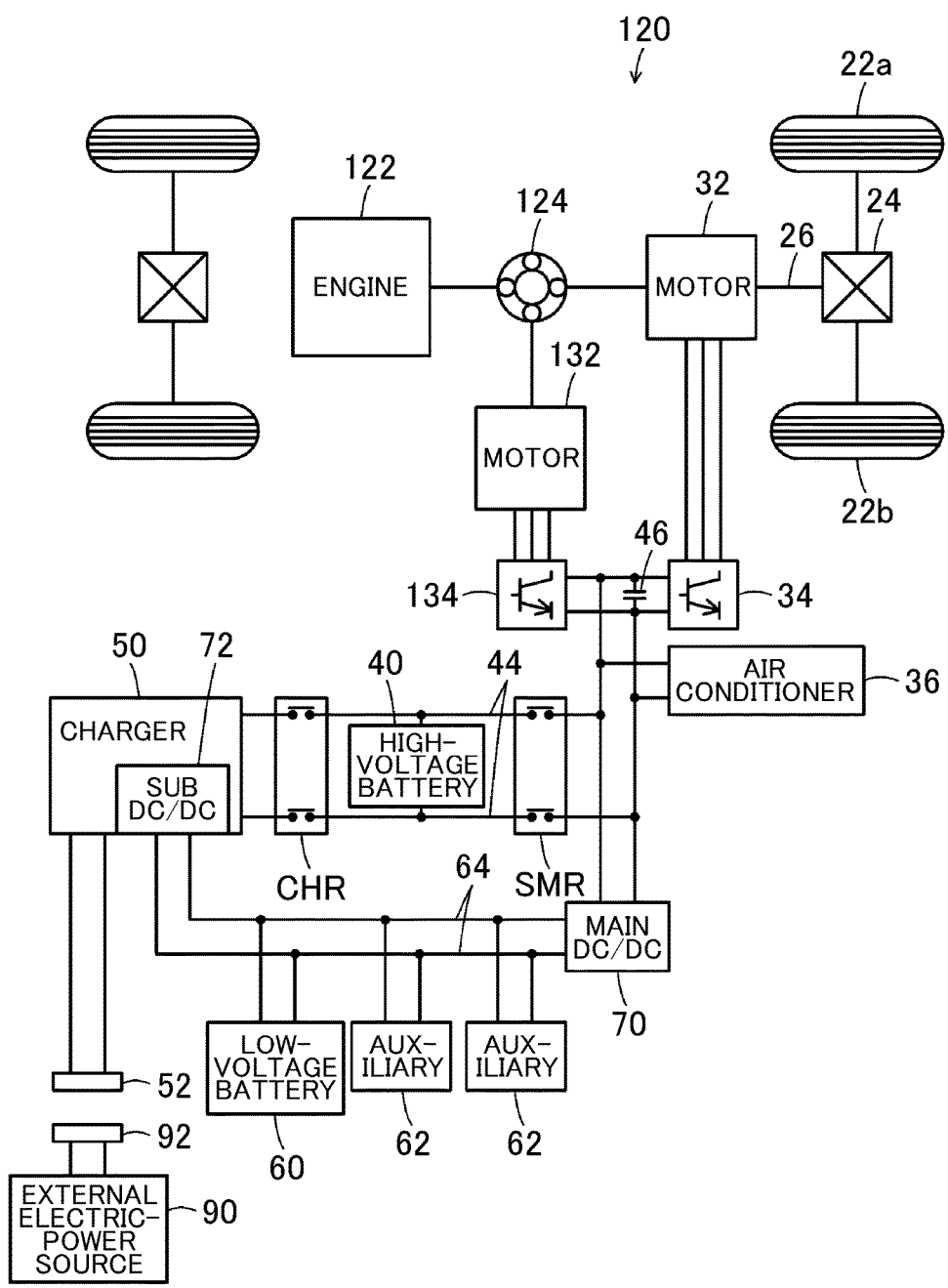
FIG. 4 is a configuration diagram illustrating a schematic configuration of a hybrid automobile in a modification.

The electric automobile 20 in the example includes the motor 32, the inverter 34, and the high-voltage battery 40, and is configured to allow the external charging in which the high-voltage battery 40 is charged with the electric power from the external electric-power source 90. However, the electric automobile 20 may include the motor 32, the inverter 34, and the high-voltage battery 40, as well as an engine 122, a planetary gear 124, a motor 132, and an inverter 134, and may be configured to allow the external charging, as illustrated in the form of a hybrid automobile 120 in a modification in FIG. 4. Here, the motor 132 is connected to a sun gear of the planetary gear 124, the engine 122 is connected to a carrier of the planetary gear 124, and the driving shaft 26 and the motor 32 are connected to a ring gear of the planetary gear 124. The inverter 134 is used for driving the motor 132 and connected to the high-voltage-system electric power line 44 together with the inverter 34.

In the example, the motor 32 functions as a "motor", the high-voltage battery 40 functions as a "high-voltage battery", the charger 50 functions as a "charger", the plurality of auxiliaries 62, the charge ECU 56, the auxiliary ECU 66, the main ECU 80 function as "low-voltage devices", the main DC/DC converter 70 functions as a "first DC/DC converter", the sub DC/DC converter 72 functions as a "second DC/DC converter", and the main ECU 80 that executes the control routine of FIG. 2, the charge ECU 56, and the auxiliary ECU 66 function as "electronic control unit ".

The above embodiment has been used to describe a mode for carrying out the disclosure and is merely a specific example of the disclosure. The disclosure is limited to nothing whatever of such an embodiment and may be obviously carried out using various modes without departing from the scope of the disclosure.

The disclosure is available in the industry of automobile manufacturing and the like.

What is claimed is:
1. An automobile, comprising:
a motor configured to drive the automobile;
a high-voltage battery connected to the motor via a high-voltage-system electric power line;
a charger connected to the high-voltage-system electric power line, the charger being capable of charging the high-voltage battery with electric power from an external electric-power source;
a low-voltage device connected to a low-voltage-system electric power line;
a first DC/DC converter connected to the high-voltage-system electric power line and the low-voltage-system electric power line, the first DC/DC converter being capable of supplying electric power of the high-voltage-system electric power line to the low-voltage-system electric power line with step down of voltage;
a second DC/DC converter connected to the high-voltage-system electric power line on a side closer to the charger than the first DC/DC converter and to the low-voltage-system electric power line, the second DC/DC converter having a rated output that is lower than a rated output of the first DC/DC converter and being capable of supplying electric power of the high-voltage-system electric power line to the low-voltage-system electric power line with step down of voltage; and
an electronic control unit that is configured to, in a case where ignition-on operation is made in first electric power supply processing during the external charging, the first electric power supply processing being processing in which only the second DC/DC converter is selected to run from between the first DC/DC converter and the second DC/DC converter to supply electric power to the low-voltage-system electric power line, a post-operation electric energy being an electric energy consumption of the low-voltage device after the ignition-on operation,
i) continue the first electric power supply processing when the post-operation electric energy is not larger than a predetermined electric energy, and
ii) make a switch to second electric power supply processing in which only the first DC/DC converter is selected to run from between the first DC/DC converter and the second DC/DC converter to supply electric power to the low-voltage-system electric power line when the post-operation electric energy exceeds the predetermined electric energy.
2. The automobile according to claim 1, wherein the electronic control unit is configured to perform automatic ignition-off when a predetermined time period elapses from the ignition-on operation.

3. The automobile according to claim 1, further comprising
an instruction switch that issues instructions to secure electric power, using electric power from the external electric-power source, for operation of the low-voltage device and a high-voltage device that is connected to the high-voltage-system electric power line,
wherein the electronic control unit is configured to make a switch from the first electric power supply processing to the second electric power supply processing despite the post-operation electric energy being not larger than the predetermined electric energy, in a case where the instruction switch is turned on after the ignition-on operation while the first electric power supply processing is executed.

4. The automobile according to claim 3, wherein
i) in a case where the instruction switch is off after the ignition-on operation, the electronic control unit configured to perform automatic ignition-off when a predetermined time period elapses from the ignition-on operation, and
ii) in a case where the instruction switch is on after the ignition-on operation, the electronic control unit configured not to perform the automatic ignition-off even when the predetermined time period elapses from the ignition-on operation.

5. The automobile according to claim 1, further comprising
an instruction switch that issues instructions to secure electric power, using electric power from the external electric-power source, for operation of the low-voltage device and a high-voltage device that is connected to the high-voltage-system electric power line,
wherein the electronic control unit is configured to make a switch from the first electric power supply processing to the second electric power supply processing when the instruction switch is turned on after the ignition-on operation.

6. The automobile according to claim 5, wherein
i) in a case where the instruction switch is off after the ignition-on operation, the electronic control unit configured to perform automatic ignition-off when a predetermined time period elapses from the ignition-on operation, and
ii) in a case where the instruction switch is on after the ignition-on operation, the electronic control unit configured not to perform the automatic ignition-off even when the predetermined time period elapses from the ignition-on operation.

7. The automobile according to claim 1, further comprising:
a capacitor attached to the high-voltage-system electric power line; and
a system main relay provided, on the high-voltage-system electric power line, between the motor, the capacitor, and the first DC/DC converter, and the high-voltage battery and the charger.

8. The automobile according to claim 7, wherein the electronic control unit is configured to make a switch to the second electric power supply processing by turning on the system main relay.

* * * * *